Nov. 25, 1952      T. C. MARTIN      2,618,882
FLY SWATTER
Filed Sept. 6, 1947
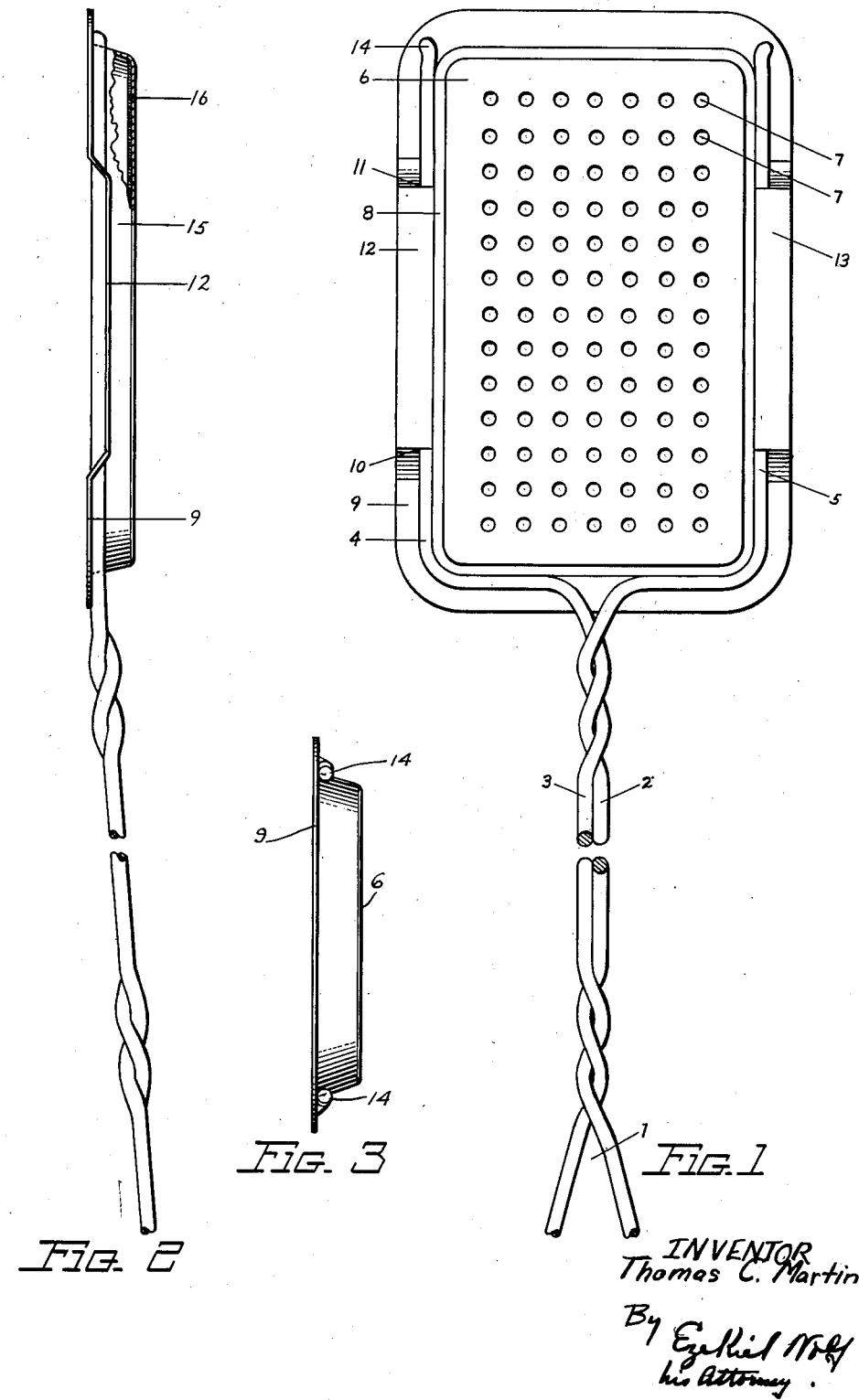
INVENTOR
Thomas C. Martin
By Ezekiel Wolf
his Attorney Patented Nov. 25, 1952

2,618,882

UNITED STATES PATENT OFFICE 2,618,882

FLY SWATTER

Thomas C. Martin, Natick, Mass.

Application September 6, 1947, Serial No. 772,537

3 Claims. (Cl. 43—136)

The present invention relates to fly swatters but is of a type in which the fly or insect is caught rather than struck and crushed as in the usual fly swatter. The objection to the ordinary fly swatter is that when the fly is struck by the swatter, it is usually crushed and leaves a stain either on the table, wall, or other place where it is killed.

In the present invention, the device is similar in some respects to the ordinary fly swatter, but the surface on which the fly is caught is offset with respect to a surrounding rim forming a dished-like member, so that as the swatter is brought down over the fly the fly is not hit by the surface of the dished-like member and therefore not crushed. The surface, however, is covered with an adhesive substance so that when the fly moves from the wall or table or whatever surface it is on, it will come in contact with the surface which by its adhesive substance catches and retains the fly without marking or staining the surface on which the fly was resting.

A further advantage of the present invention is that the catching element or surface may be made of a formed or molded cardboard member which may be covered with adhesive to catch the fly, the member being removable and replaceable so that when it becomes filled and used another member may be substituted in its place. The member is perforated all over its surface and a holder with forked ends may be attached to it. Other common means for holding the dished member may be used as will be obvious to those skilled in the art, but the applicant prefers the arrangement as described in the specification below, which is simple, economical, and easily replaceable.

The advantages and merits of the present invention will be more particularly realized from the description in the specification below when taken in connection with the drawings, in which:

Fig. 1 shows a bottom plan view of the fly swatter;

Fig. 2 shows a side view; and

Fig. 3 an end view.

As indicated more particularly in the figures, the swatter may be constructed of a long wire handle 1, of twisted sections 2 and 3 formed of a single wire element with end prongs 4 and 5 which are terminations of the ends of the single wire. These end prongs may be formed parallel to the handle similar to the prongs of a fork with the tines a distance apart at least equal to the distance between slots or holes for the reception of the prongs in the side flanges of a fly swatter cup or catching surface. The fly swatter cup or dished member is formed with a recessed center plane section 6 which is perforated by perforations 7 all over the surface so as to permit the air to pass through it as the fly swatter is swung downward to the surface on which the fly rests. About the dished portion 6 of the plate or cup is a raised side with an outwardly extending flange 9 which is provided with slots or holes 11 and 11 on either side, through which the tines 4 and 5 are inserted for holding the plate, cup, or dished member in place. As indicated more clearly in Fig. 2 the flange 9 is pressed backwards in the sections 12 and 13 so that the tines pass under and over them, the prongs or tines exerting sufficient spring tension against the flanges to hold the plate rigidly in place. In addition to this, the tines may be slightly hooked at the ends 14 and preferably tensioned inwards just before the ends 14 so as to exert a slight pressure against the side walls 15 of the dished portion of the cup. The wire tines have sufficient spring force for this purpose and the only thing which is necessary to provide for this reaction is to make the width between the dished side walls 15 slightly greater than the normal width between the tines. The surface 16 of the inside of the cup is covered with some adhesive substance such as glue or resinous material to which the fly will stick when it is caught. In the use of the device, it is not necessary to bring the swatter's dished surface downward on the surface on which the fly rests. It is only necessary to bring it over the fly which upon flying from the surface will be caught by the swatter and the sticking surface on the inside of the dished member.

If it is desired to use the fly swatter as a regular swatter, the back of the cup can be used for this purpose so that where there is no danger of staining the surface the fly swatter may be used as a regular swatter, and where there are, for instance, curtains, walls, cloths, or the like, the cup side of the surface is used to catch the fly.

The dished cup like member may be molded of a paper or paper-like material or may be of plastic or light metal. The adhesive surface may be applied as a sheet to a permanent cup or dished member, or the members themselves may be coated and replaceable.

Having now described my invention, I claim:

1. A fly swatter comprising a holder with prongs at one end thereof, a shallow, elongated dished-like member with outwardly extending flanges on both sides thereof at the open rim of the member, said flanges being slotted transversely from the inner side of the flange outward with the region between the slots in the flange pressed backwards from the rest of the flange through which slots the prongs are inserted, the inside of the dished portion of the dished-like member being coated with a fly retaining adhesive.

2. A fly swatter of the type described, comprising a holder having spaced prongs at one end thereof, a rectangular dished member of paper material having outwardly projecting flanges at the peripheral rim of the dished member with a central section on each flange depressed from the normal surface of the flange backwards in the same direction as the dished member, said depressed flanges being provided with transverse slots at each end of said depressed section and at the junctions of the depressed sections with the flanges through which said prongs extend, the inside of the dished portion being coated with a fly retaining adhesive, said dished portion being perforated through the surface.

3. A fly swatter of the type described, comprising a spring wire holder having spaced prongs at one end thereof, a rectangularly shaped dished member of paper material having outwardly projecting flanges with sections depressed from the normal surface of the flanges, said flanges being slotted transversely at the junctions of the depressed sections through which said prongs extend, the inside of the dished portion being perforated through the surface, said prongs being biased towards each other the normal spacing between the prongs being slightly less than the width of the dished section whereby when the prongs are forced through the slots in the flanges they will hug the sides of the dished member adjacent the depressed flanges.

THOMAS C. MARTIN.

REFERENCES CITED

The following references are of record in the file of this patent:

UNITED STATES PATENTS

| Number | Name | Date |
|---|---|---|
| 625,955 | Kendle | May 30, 1899 |
| 1,009,227 | Rozir | Nov. 21, 1911 |
| 1,354,775 | Moore | Oct. 5, 1920 |
| 1,604,460 | Marlow | Oct. 26, 1926 |
| 1,718,805 | Wilkie et al. | June 25, 1929 |
| 2,110,640 | Aldrich | Mar. 8, 1938 |
| 2,236,454 | Stambaugh | Mar. 25, 1941 |